(12) United States Patent
Guralnick

(10) Patent No.: US 6,532,008 B1
(45) Date of Patent: Mar. 11, 2003

(54) METHOD AND APPARATUS FOR ELIMINATING STEROSCOPIC CROSS IMAGES

(75) Inventor: Brian Guralnick, Dollard-des-Ormeaux (CA)

(73) Assignee: Recherches Point Lab Inc., Amos (CA)

( * ) Notice: Subject to any disclaimer, the term of this patent is extended or adjusted under 35 U.S.C. 154(b) by 0 days.

(21) Appl. No.: 09/523,706

(22) Filed: Mar. 13, 2000

(51) Int. Cl.$^7$ ............................................. G06T 15/00
(52) U.S. Cl. ....................... 345/419; 345/7; 345/8; 345/58; 348/42; 348/51
(58) Field of Search ................... 345/419, 7, 8, 345/9, 58; 348/42, 51; 359/462, 464

(56) References Cited

U.S. PATENT DOCUMENTS

| | | |
|---|---|---|
| 4,562,463 A | 12/1985 | Lipton |
| 4,884,876 A | 12/1989 | Lipton et al. |
| 4,979,033 A | 12/1990 | Stephens |
| 5,142,642 A | 8/1992 | Sudo |
| 5,357,277 A | 10/1994 | Nakayoshi et al. |
| 5,402,191 A | 3/1995 | Dean et al. |
| 5,602,679 A | 2/1997 | Dolgoff et al. |
| 5,781,229 A | 7/1998 | Zediker et al. |
| 5,886,816 A | 3/1999 | Faris |
| 5,933,127 A | 8/1999 | DuBois |
| 5,936,663 A | 8/1999 | Tabata et al. |

FOREIGN PATENT DOCUMENTS

| | | |
|---|---|---|
| EP | 0 953 962 A2 | 11/1999 |
| JP | 2000 134644 A | 5/2000 |
| JP | 2001 054142 | 2/2001 |
| JP | 2001 054143 | 2/2002 |

OTHER PUBLICATIONS

Lipscomb J S et al: <<Reducing Crosstalk Between Steroscopic Views>> Proceedings of the SPIE, SPIE, Bellingham, VA, U.S., vol. 2177, 1994, pp. 92–95, XP000892315.

*Primary Examiner*—Mark Zimmerman
*Assistant Examiner*—Kimbinh T. Nguyen
(74) *Attorney, Agent, or Firm*—Ogilvy Renault; James Anglehart

(57) ABSTRACT

The preferred embodiment of the present invention compensates for the phosphorous glow of cathode ray tube displays which is retained from one image to the next and eliminates the ghosting effect seen when viewing 3-D images using shutter, polarized or colored stereoscopic glasses. It can additionally be used to compensate for light leaking through LCD shutter glasses. The source images for each eye are not displayed directly once modulated. The source images are modified using positive and negative ratio combinations of both eye images to be displayed to each eye. The displayed image for one eye is a percentage of the source image for that eye, minus a percentage of the source image for the other eye, plus a percentage of white. The ratio can be preset or modified in real-time by the viewer.

19 Claims, 21 Drawing Sheets

Left Image Seen Through left eye of Glasses FIG. 8 — 34

Right Image Seen Through Right eye of Glasses FIG. 9 — 36

Mixture of Left and Right Images on Display FIG. 7 — 28

Left Source Image FIG. 5 — 30

Right Source Image FIG. 6 — 32

FIG. 2 (Prior Art)

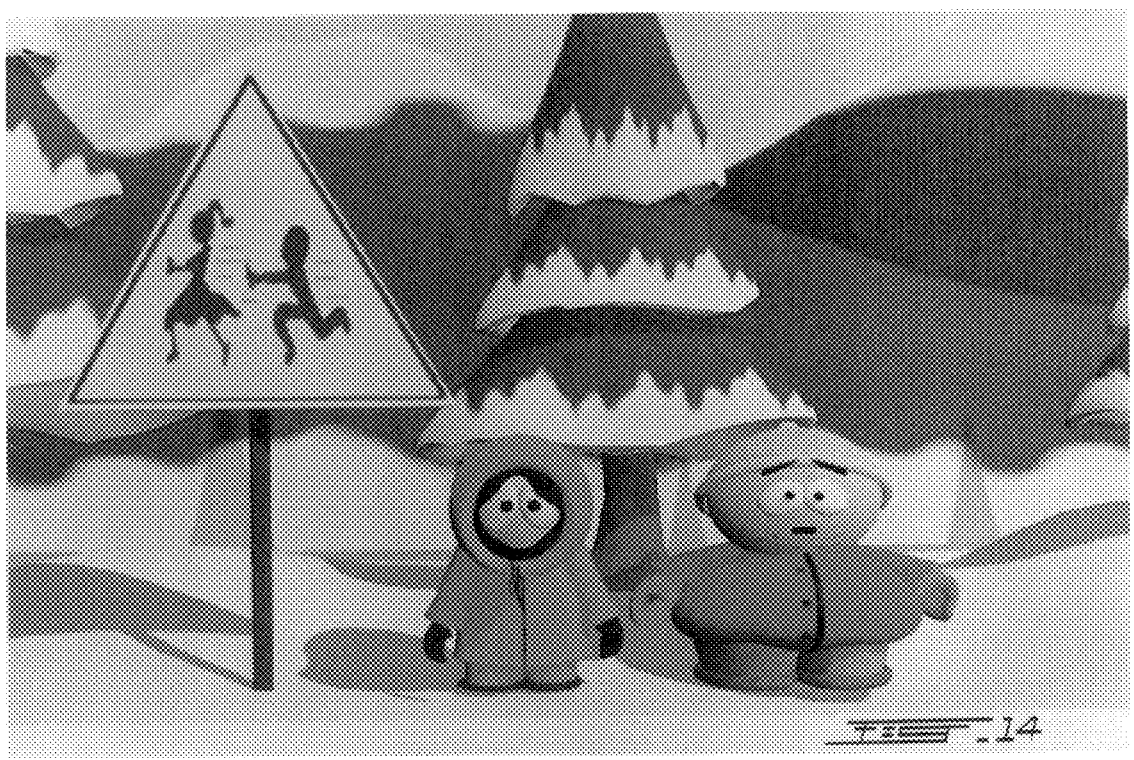

METHOD AND APPARATUS FOR ELIMINATING STEROSCOPIC CROSS IMAGES

FIELD OF THE INVENTION

The invention relates to the field of stereoscopic displays in general and more particularly to digital processing done on the stereoscopic images to be projected.

BACKGROUND OF THE INVENTION

Stereoscopic 3-D imaging requires the presentation of two slightly different sets of images to a viewer, one set corresponding to a left eye viewpoint and the other corresponding to a right eye viewpoint. When the sets are presented so that only the left eye of a viewer can see the left eye set of images and only the right eye can see the right eye set of images, the viewer will be able to perceive a 3-D image.

When a common display for both eyes is used, three methods are usually used to ensure that only the set of right eye images is seen by the right eye and only the set of left eye images is seen by the left eye. The first method is to project both sets of images in different colors and to make the viewer wear glasses which filter the appropriate colors to show different images for each eye. The colors that are mostly used are red and blue. The main disadvantage of this method is that the resulting 3-D images are deficient in color information.

The second method is to use polarized images and polarizing glasses. Each lens of the glasses has a polarized filter which corresponds to a direction of polarization of the polarized images projected. The axes of polarization are usually 90 degrees apart. Two projectors are used with polarization filters corresponding to the axes of the filters on the lenses. The images are shown simultaneously but each eye sees a different image. The major disadvantage of this method is that the quality of the 3-D effect decreases substantially as the viewer tilts his or her head to either side.

The third method uses shutter glasses and multiplexes the sets of images in time. Liquid crystal display (LCD) shutter glasses are used to alternately display left eye and right eye images to a viewer in order to provide the illusion of 3-D. Since the viewer looks at a single video monitor which displays alternately left eye and right eye images, every other frame, in synchronism with the switching of the shutter glasses, the video screen must respond quickly to the switching from one image to the other. Otherwise, there is some blurring of the left image with the right image seen by the wearer of the glasses. This blurring is often referred to as "ghosting effect", "cross-talk" or "cross-images". The delay in a refresh of the video screen has to do with the specific phosphorus used and is a difficult parameter to control.

U.S. Pat. No. 5,402,191 describes an improvement of the LCD scattering shutter using light scattering to help eliminate crosstalk. This method improves the quality of the LCD's, but it does not eliminate the ghosting effect completely because the computer monitor's picture tube or cathode ray tube (CRT) uses phosphor to convert the cathode rays into visible light. These phosphors retain a glow from one frame to the next. As mentioned in U.S. Pat. No. 5,402,191 at column 2, lines 48 through 52, the alternating left-eye frames & right-eye images are displayed in succession. So, when the monitor draws the right-eye image, the monitor's phosphor still retains a bit of light from the previously displayed left-eye image.

Even if the LCD shutters were absolutely perfect and did not allow any light through when blocking out the appropriate image to the appropriate eye, when the shutter opens to show the successive image, there is still a dim image retained from the previous eye-image by the monitor's phosphor. To the viewer, there appears to be a ghost in the image which is really the alternate image for the alternate eye. This ghosting effect is very tiring for the eyes of the viewer and, when the systems are used for prolonged periods of time, they are known to cause headaches and blurring of the viewer's vision.

Other existing techniques for eliminating the "crosstalk" are usually improvements in either the display technology (e.g. laser displays), for example in U.S. Pat. No. 5,781,229, or use multiple displays, a monitor for each eye, for example in U.S. Pat. No. 5,936,663. These techniques are very expensive and require new equipment.

Most prior art techniques deal with new methods of alternating the left-eye & right-eye images in succession to eliminate the ghosting effect. These techniques have not proven to completely eliminate the ghosting effect.

There is a need for a system for viewing images in 3-D which eliminates cross-talk between left- and right-eye images.

SUMMARY OF THE INVENTION

Accordingly, an object of the present invention is to provide a method for eliminating the ghosting effect present when viewing 3-D images on a screen.

Another object of the present invention is to provide a 3-D projection system which permits the user to enjoy viewing 3-D images for a longer period of time.

Another object is to eliminate crosstalk between 3-D images using existing equipment.

Another object of the present invention is to eliminate crosstalk while keeping the projection apparatus at a low price.

Another object of the present invention is to modify the successive images to compensate for image leakage between the eyes, such as the retained image by the phosphor glow of the CRT in the case of shutter glasses, shutter inefficiency, polarizer inefficiency in the case of polarized displays, or filter inefficiency in the case of color separation.

In accordance with a first aspect of the present invention, there is provided a method for eliminating a ghosting effect in images to be viewed in 3-D, the method comprising creating a left source image and a right source image, compensating said left source image and said right source image for image leakage to obtain a compensated left image and a compensated right image, displaying said modulated compensated image.

Another method is provided wherein said step of compensating said left source image and said right source image comprises creating a compensated left image by taking a first percentage of said left source image and subtracting a second percentage of said right source image, creating a compensated right image by taking a third percentage of said right source image and subtracting a fourth percentage of said left source image.

Another method for eliminating a ghosting effect in images to be viewed with a 3-D stereoscopic apparatus, the method comprising creating a left source image and a right source image, modifying the left source image using information from the right source image, modifying the right source image using information from the left source image, displaying the compensated left image and compensated right image on a common display in a manner enabling 3-D viewing and wherein a viewer sees a 3-D stereoscopic image of the left and right images with reduced cross image.

Another method is provided for calibrating the compensation done on source images to be displayed in 3-D on a common display, the method comprising providing an adjustment for at least one parameter of the proportion of the left eye image and the proportion of the right eye image, obtaining a user input with respect to the image displayed, using the user input to calibrate the compensation done on the source image.

Another method is provided in which the parameter comprises a proportion of white.

Another method is provided in which the calibration of the compensation is done for each eye.

An apparatus for eliminating the ghosting effect present when viewing 3-D stereoscopic images is also provided, the apparatus comprises an image editor and composer for creating left and right source images, an image compensator for creating left and right compensated images, a display apparatus for displaying the left and right compensated images in a manner enabling 3-D viewing.

Another apparatus is provided in which the image compensator comprises a first adder, a second adder, a first mixer and a second mixer wherein a proportion of the left source image is added in the first adder to a positive or negative proportion of the right source image calculated by the second mixer, a proportion of the right source image is added in the second adder to a positive or negative proportion of the left source image calculated by the first mixer and whereby a compensated left image and a compensated right image are produced. White can also be added to the images to better compensate for the ghosting effect.

In accordance with another aspect of the present invention, there is provided an electronic medium on which is recording data corresponding to a software module which, when loaded in a computer and executed, carries the steps of a method according to the present invention or constitutes an apparatus according to the present invention.

Another apparatus is provided for calibrating the compensation done to eliminate the ghosting effect present when viewing 3-D stereoscopic images. The apparatus comprises an image editor and composer for creating left and right source images, an image compensator for creating left and right compensated images, a display apparatus for displaying the left and night compensated images in a manner enabling 3-D viewing, a compensation selector for selector an appropriate calibration of the compensation and a user input interface for entering the user selection for the compensation. The compensation factor selected is then sent to the image compensator which uses it to compensate the left and right source images.

In accordance with another aspect of the present invention, there is provided a method for eliminating a ghosting effect in images prepared for 3-D viewing by a 3-D stereoscopic apparatus. The method comprises obtaining a source image stream containing alternating left source images prepared for 3-D viewing and right source images prepared for 3-D viewing, buffering the source image stream by a delay of one image, using the buffered source image stream and the source image stream to obtain the corresponding left and right source images, modifying the left source image using information from the right source image to create a compensated left source image, modifying the right source image using information from the left source image to create a compensated right source image, displaying the compensated left image and compensated right image on a common display in a manner enabling 3-D viewing and wherein a viewer sees a 3-D stereoscopic image of the left and right images with reduced cross image.

DESCRIPTION OF THE DRAWINGS

These and other features, aspects and advantages of the present invention will become better understood with regard to the following description and accompanying drawings wherein:

FIG. 2 (Prior Art) is a block diagram of the method of displaying 3-D images of the prior art;

FIG. 13 is an image resulting from a ghost removal process according to a preferred embodiment of the present invention of the images of FIG. 5 and FIG. 6, the image is as displayed, that is, viewed without looking through glasses;

FIG. 14 is an image seen when looking at the image of FIG. 13 through the left lens of the glasses;

FIG. 15 is an image seen when looking at the image of FIG. 13 through the right lens of the glasses;

FIG. 16 is a modulated and compensated left image which is produced by the ghost removal process image;

FIG. 17 is a modulated and compensated right image which is produced by the ghost removal process image;

DETAILED DESCRIPTION OF THE PREFERRED EMBODIMENT

Figure 1:
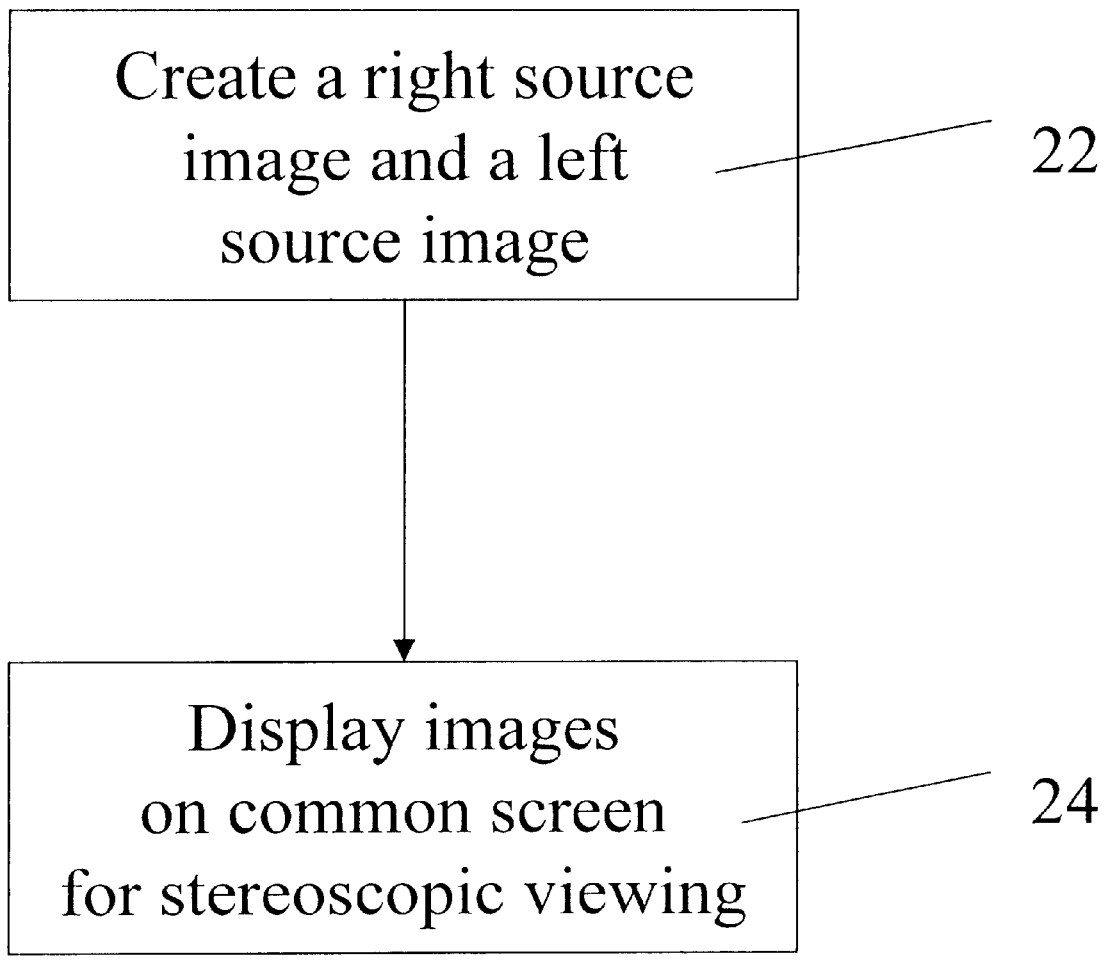
FIG. 1 (Prior Art) is a flow chart of the method of displaying 3-D images according to the prior art.

Referring now to FIG. 1, there is shown a simple flow chart of the method used by the prior art systems to display 3-D images. A right source image and a left source image are created 22. These source images correspond to the same image viewed from the viewpoint of each eye. Depending on the method of projection of the 3-D images, the source images can differ. For example, if polarized glassed are to be used to view the 3-D images, the creation of the source images will comprise sending the source images to two projectors and filtering the projected images with two complementary polarized filter. If colored glasses are to be used, one source image will go through a colored filter and the other source image will go through a complementary colored filter, for example, blue and red. Different algorithms can be used depending on the type of display method preferred. In the case of polarized source images and colored images, the two images will be shown simultaneously on the screen. Both projectors are synchronized. In the case of 3-D images to be viewed with shutter glasses, the right eye image and the left eye image will be projected alternately. Finally, the 3-D images are displayed 24 and the viewer can enjoy 3-D images.

The block diagram of FIG. 2 illustrates the relationship between the images of the following figures in a prior art system. An example of a left source image 30 will be shown in FIG. 5. An example of a right source image 32 will be shown in FIG. 6. A mixture of the left and right images on the display without using glasses 28 will be shown in FIG. 7. A left image seen through the left eye of the appropriate glasses 34 will be shown in FIG. 8. A right image seen through the right eye of the appropriate glasses 36 will be shown in FIG. 9.

Figure 3:
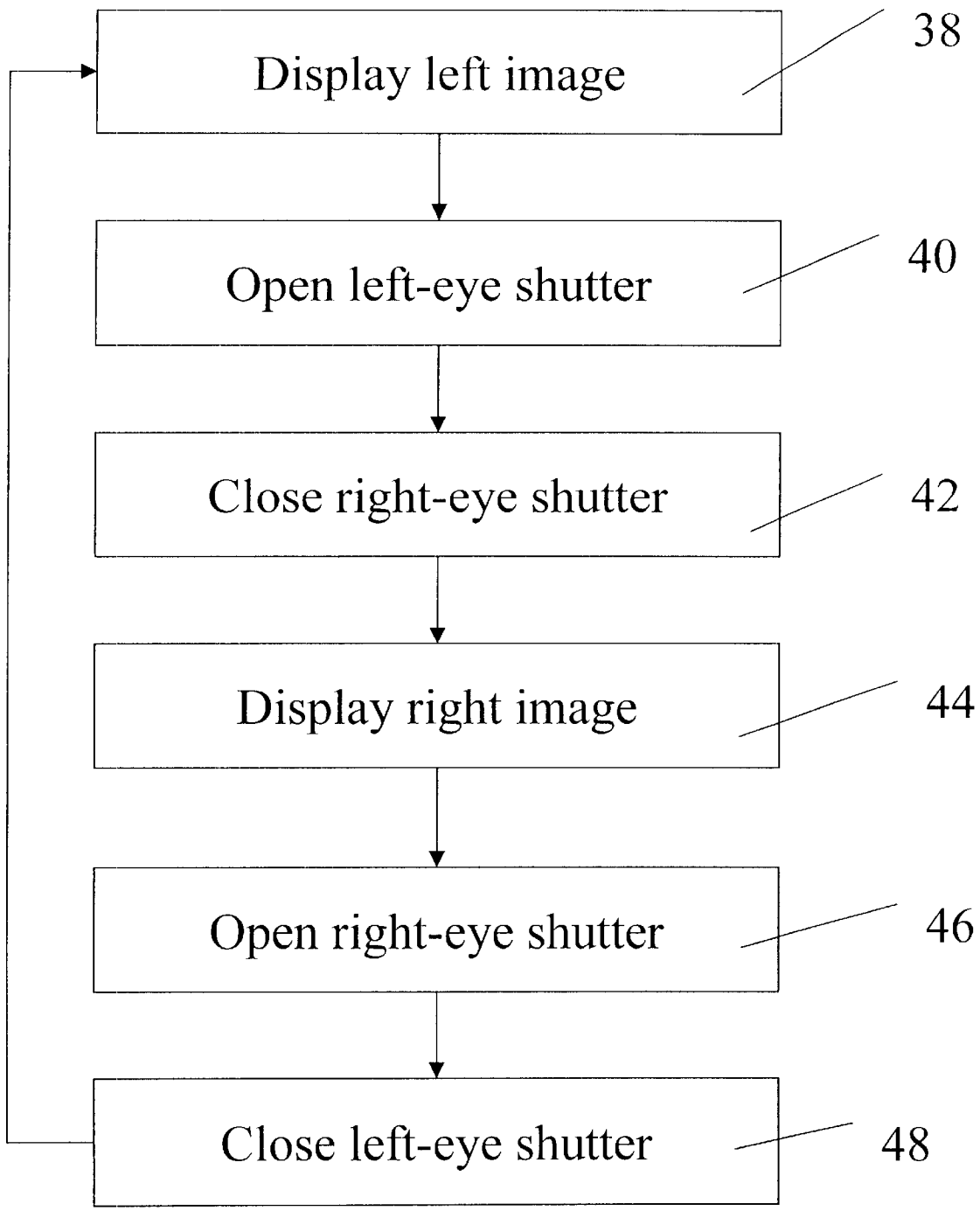
FIG. 3 (Prior Art) is a flow chart of the method of displaying 3-D images using shutter glasses in the prior art.

FIG. 3 is a flow chart illustrating the prior art sequence of events when using a shutter glasses system. The left image is first displayed 38. The left-eye shutter is opened 40. The right-eye shutter is closed 42. The right image is displayed 44. The right-eye shutter is opened 46 and the left-eye shutter is closed 48. Then, the next left image is displayed 38 and so on.

Figure 4:
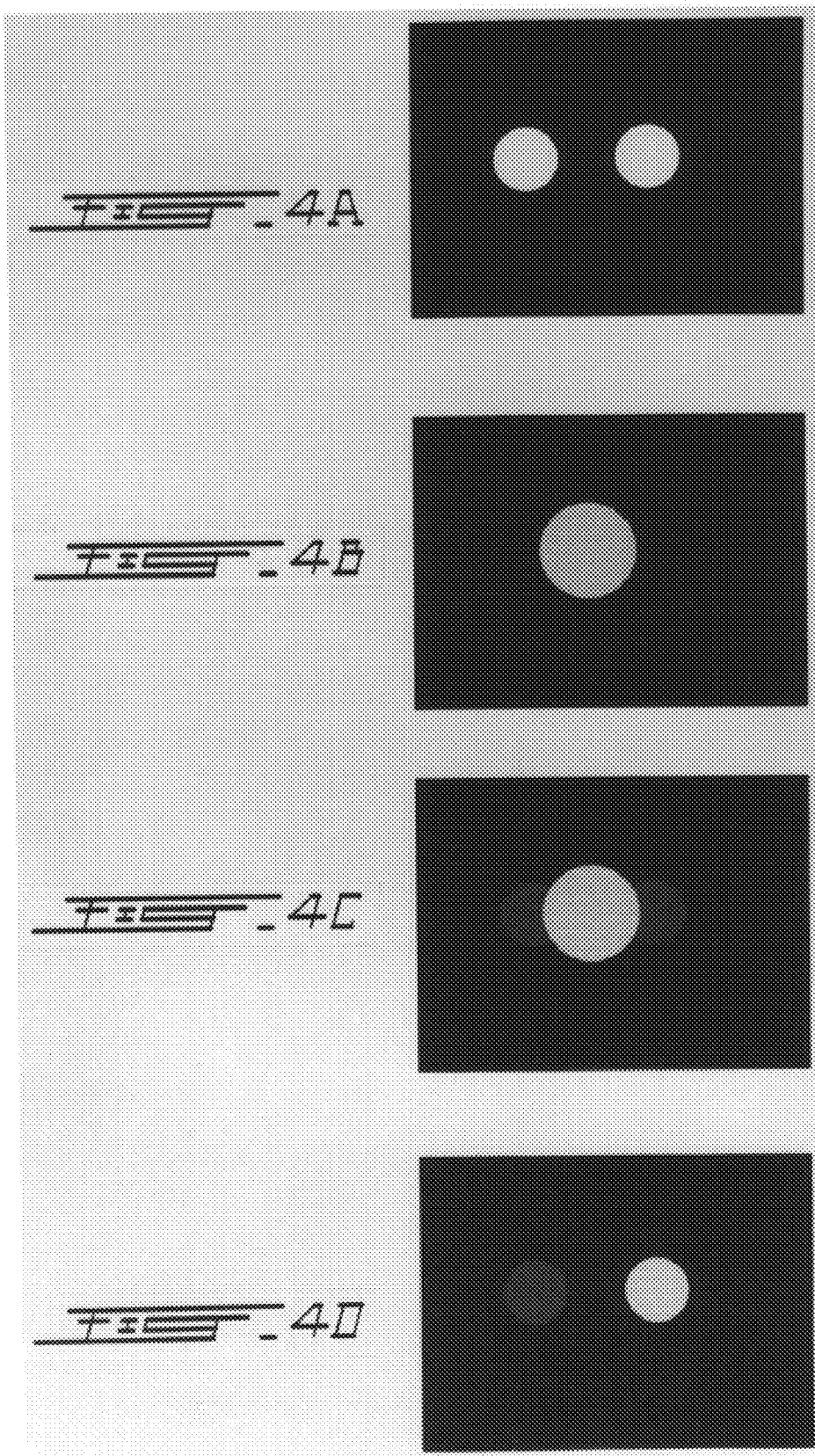
FIGS. 4A, 4B, 4C and 4D illustrate the ghosting effect.

FIGS. 4A, 4B, 4C and 4D illustrate the cross image or ghosting effect. The phosphor glow of the CRT display retains previous images. An important parameter for the stereo cross image cancellation process is how much cross image bleed through there is. The worst case bleed through is when there is a full 100% bright spot located in the same location than a black spot for the opposite eye. The example of FIGS. 4A to 4D depicts an attempt to make a single circle appear floating in front of the display. The circle on the left of FIG. 4A is intended to be viewable only to the right eye & the circle on the right is intended to be seen only by the left eye. The goal, when using a stereo viewing apparatus, is for the viewer to see something of the type of FIG. 4B. It should be noted that because this document is flat, the circle has been slightly enlarged to demonstrate that the viewer would see the 3-D circle closer than the screen, at a distance between himself and the screen. The screen or display apparatus can be a computer screen, a film movie screen, or any other type of flat displays.

Because of the bleed through, the viewer sees an image of the type of FIG. 4C. Looking through only the left lens of the stereo viewing apparatus, the viewer would see an image of the type of FIG. 4D. The circle on the right is intended, but the dark circle on the left is unwanted bleed through from the image intended for the right eye. This is called the ghosting, cross image or bleed through effect.

Figure 5:
FIG. 5 is a left source image.
Figure 6:
FIG. 6 is a night source image.
Figure 7:
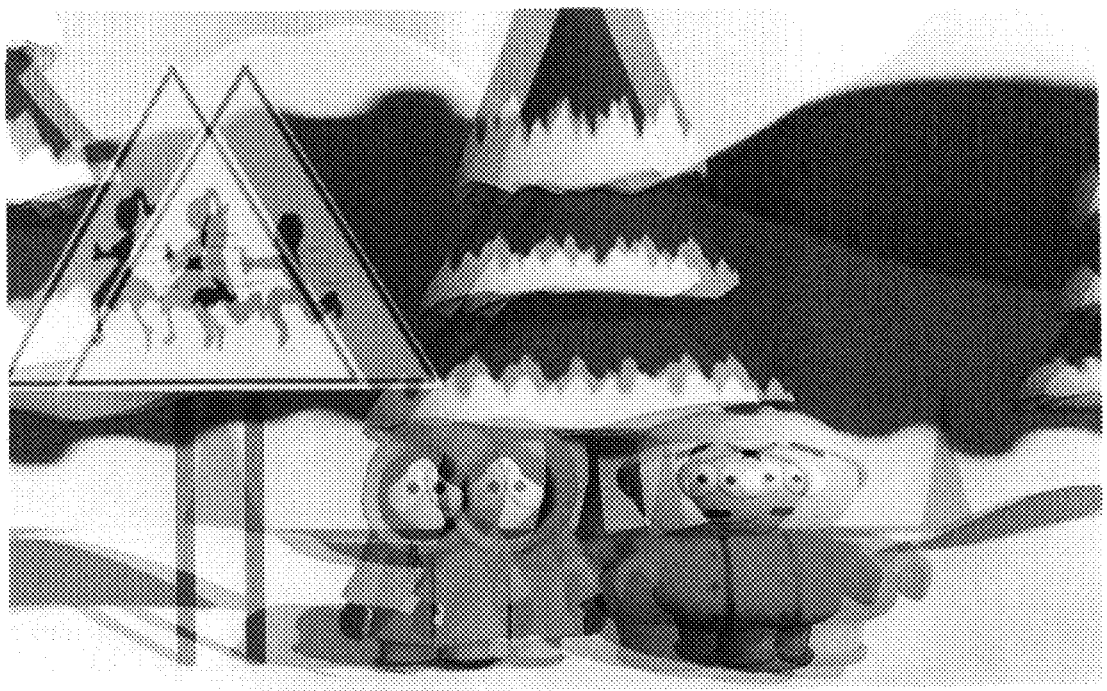
FIG. 7 (Prior Art) is an image resulting from a combination of the images of FIG. 5 and FIG. 6, the image is as displayed, that is, viewed without looking through glasses.

An example of the prior art signal processing and display will now be explained and illustrated in details. A left source image shown in FIG. 5 is first created. To make the 3-D imaging system work, this image needs to be seen only by the viewer's left eye. A right source image shown in FIG. 6 is also created. This right source image is intended to be viewed only by the viewer's right eye at the same time as the left image is viewed by the left eye. The image displayed on the screen is as shown in FIG. 7. This is what a viewer would see if he were to look at the screen without his stereo shutter glasses. This double image is created by the combination of the left and right source images. It is the responsibility of the shutter glasses to correctly modulate the opening and closing of the shutters so that the left source image is only visible to the left eye through the left eye lens of the glasses. The same goes for the right image.

Figure 8:
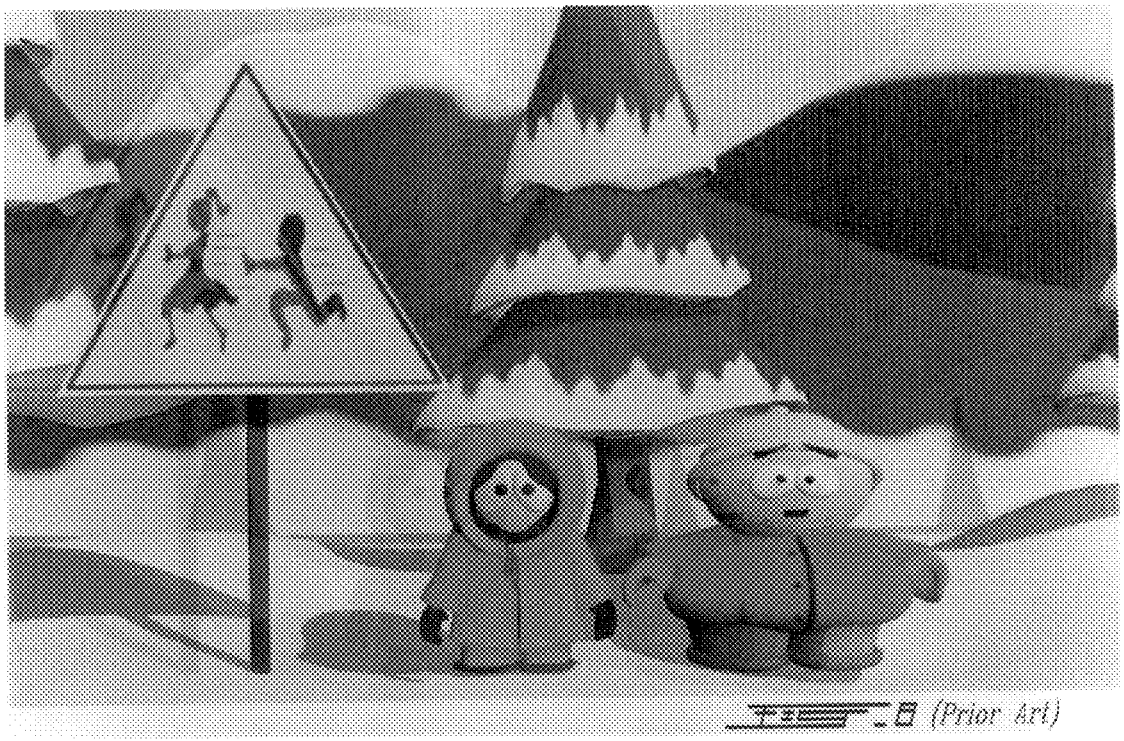
FIG. 8 (Prior Art) is an image seen when looking at the image of FIG. 7 through the left lens of the glasses.
Figure 9:
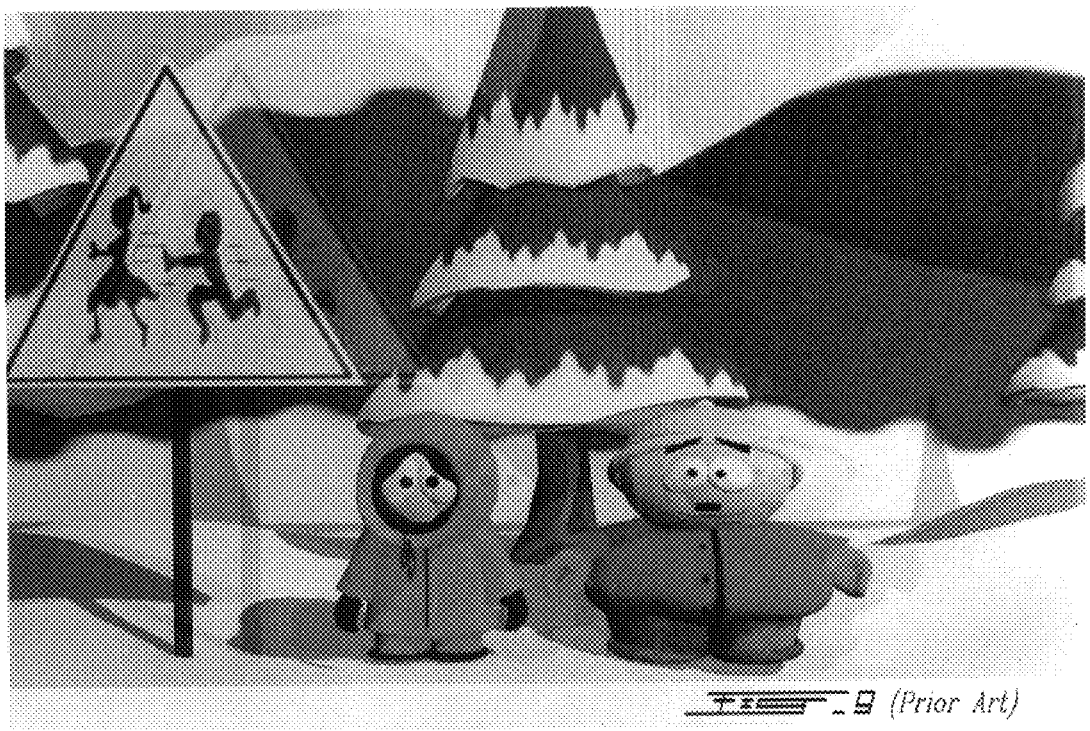
FIG. 9 (Prior Art) is an image seen when looking at the image of FIG. 7 through the right lens of the glasses.

FIG. 8 is an example of what the viewer would see when looking at the screen through the left lens of the stereo LCD shutter glasses. The secondary faint ghost images of the characters belong to the right eye source image. Limitations in current monitor and LCD shutter technologies creates this problem. Looking at this ghosted image with the right image sent to the viewer's right eye (which has a faint ghost of the left eye image) destroys the 3-D hologram. To many people, viewing these ghosted images gives the impression of double or triple images. This prevents the hologram from properly attaining its goal. This also causes major eye strain and headaches. The images appear unfocussed and extra blurry. These problems prevent LCD shutter glasses from entering the market as acceptable products for general consumers. FIG. 9 is the equivalent of FIG. 8 but for the right eye.

Figure 10:
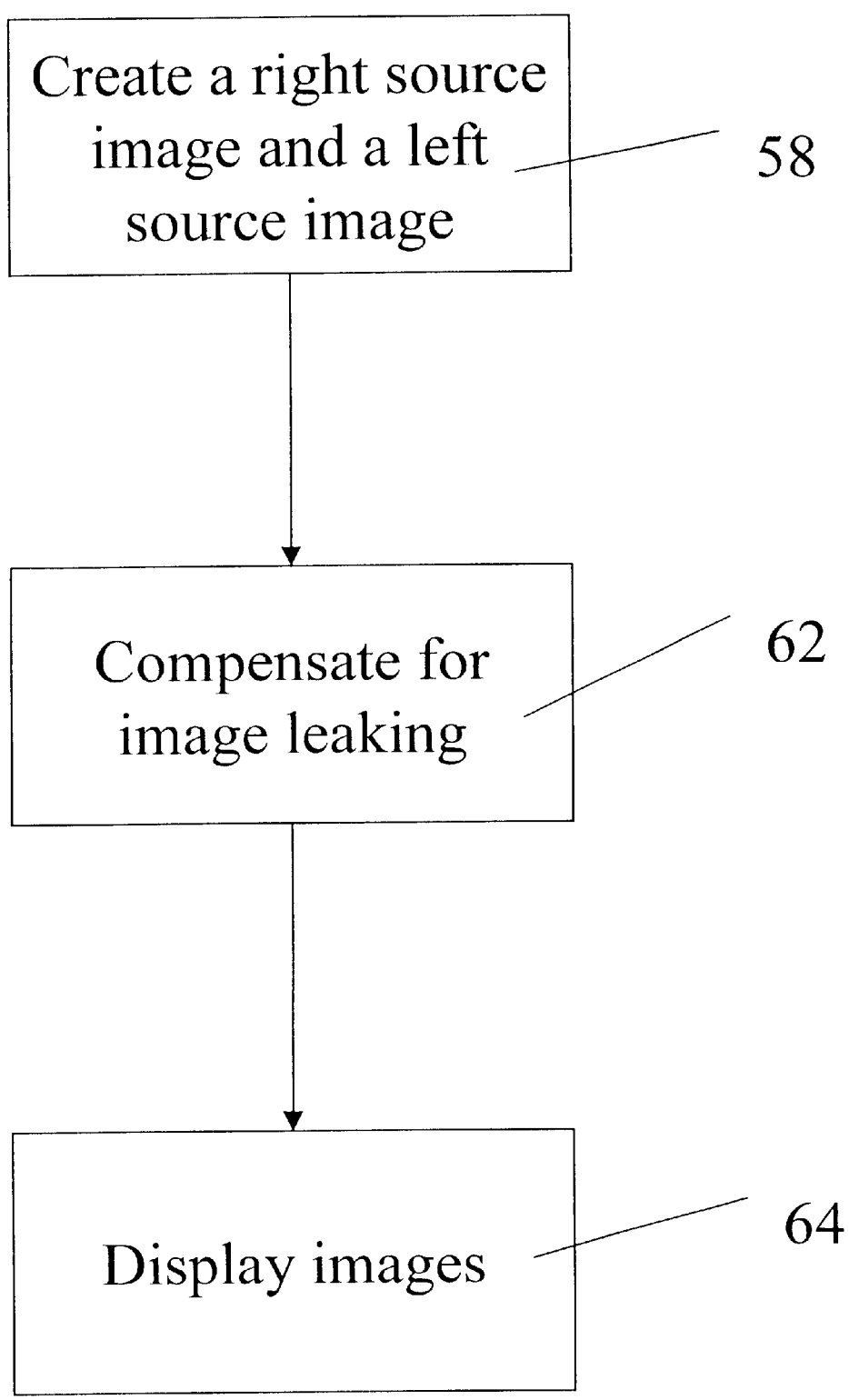
FIG. 10 is a flow chart of the method of displaying 3-D images according to a preferred embodiment of the present invention.

FIG. 10 is a flow chart illustrating the basic steps of the preferred embodiment according to the present invention. A right and a left source images are created 58. A compensation algorithm for the light leakage and phosphorous decay is applied to the images 62. The images are then displayed 64.

Figure 11:
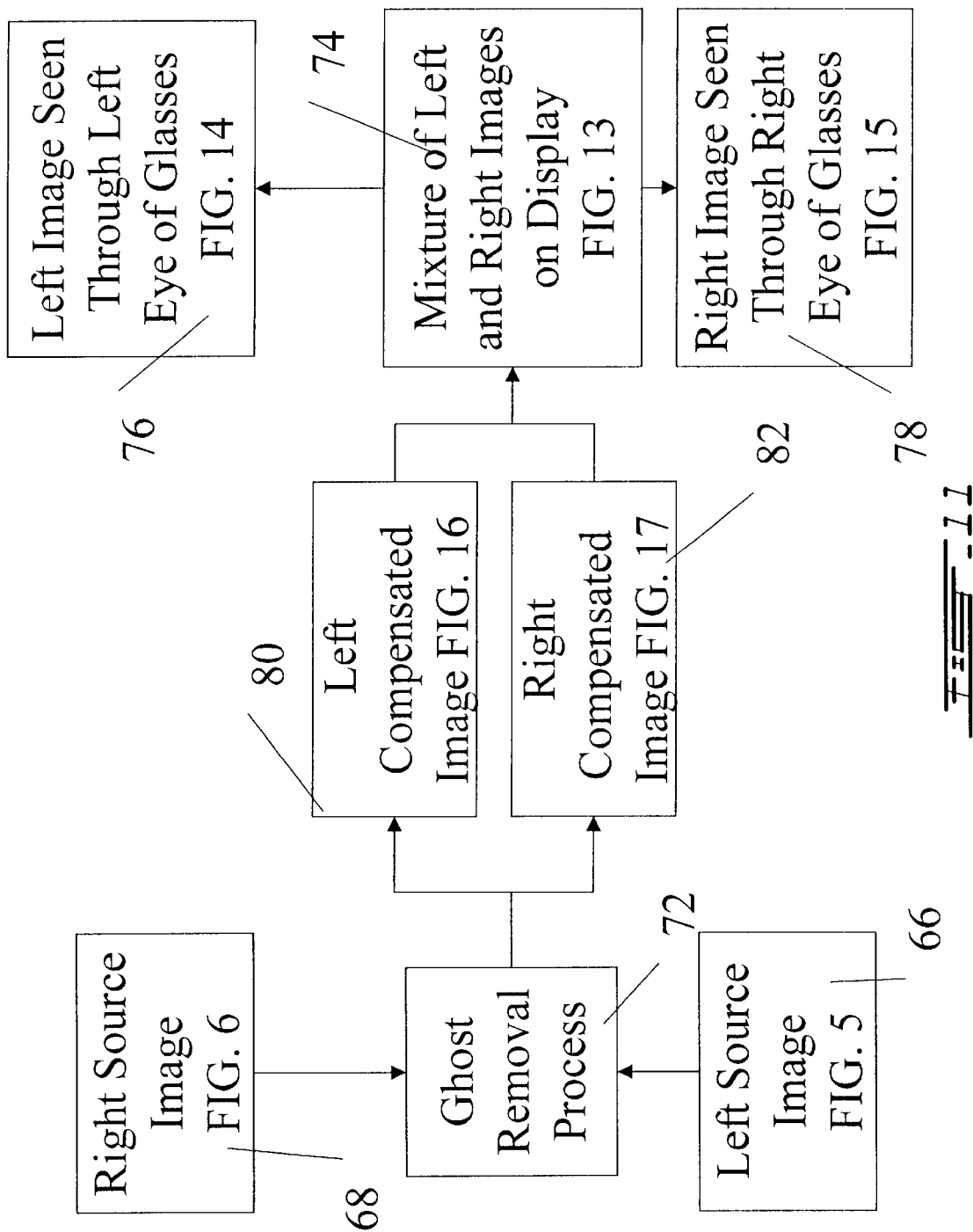
FIG. 11 is a block diagram of the method of displaying 3-D images according to a preferred embodiment of the present invention.

The block diagram of FIG. 11 illustrates the relationship between the images of the following figures representing an example of a preferred embodiment of the present invention. An example of a left source image 66 is shown in FIG. 5. An example of a right source image 68 is shown in FIG. 6. The ghost removal process 72 will be done on the right source image 68 and the left source image 66. The left compensated image that will come out of the ghost removal process 80 will be shown in. FIG. 16. The right compensated image that will come out of the ghost removal process 82 will be shown in FIG. 17. A mixture of the compensated left and right images on the display without using glasses 74 will be shown in FIG. 13. A left image seen through the left lens of the appropriate glasses 76 will be shown in FIG. 14. A right image seen through the right lens of the appropriate glasses 78 will be shown in FIG. 15.

Figure 12:
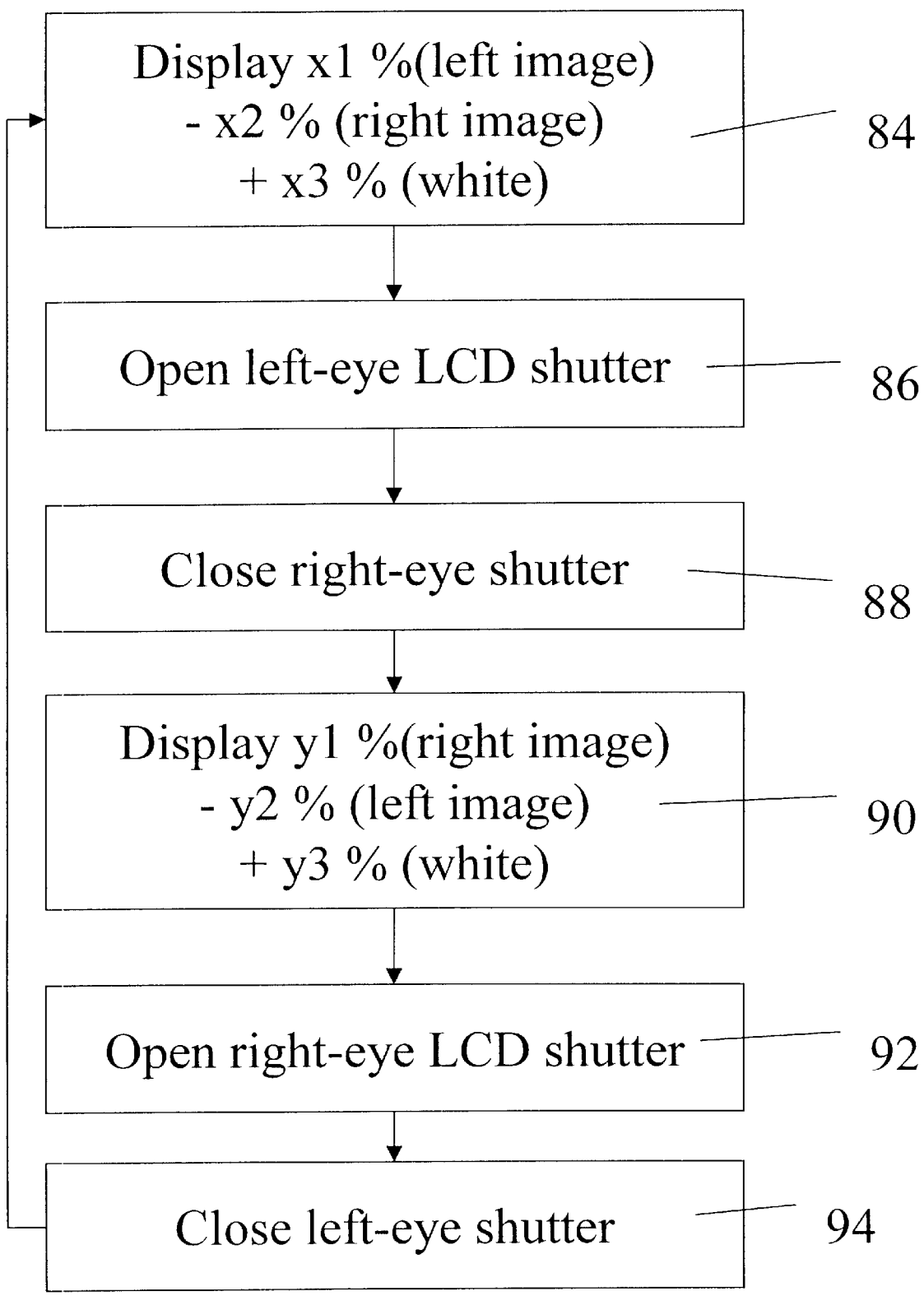
FIG. 12 is a flow chart of the method of displaying 3-D images using shutter glasses according to a preferred embodiment of the present invention.
Figure 18A:
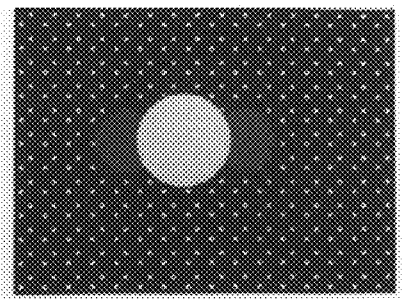
FIGS. 18A, 18B, 18C, 18D and 18E are illustrations of the calibration of the compensation for the ghosting effect using the example of FIGS. 4A, 4B, 4C and 4D.
Figure 18B:
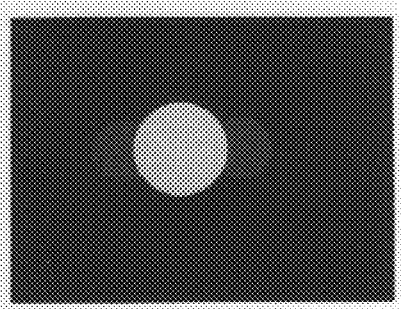
Figure 18C:
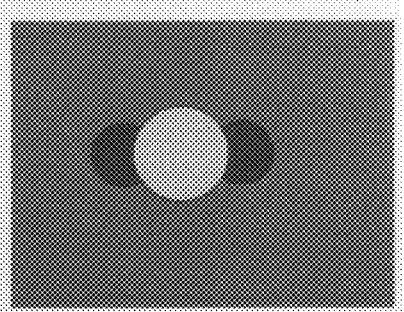
Figure 18D:
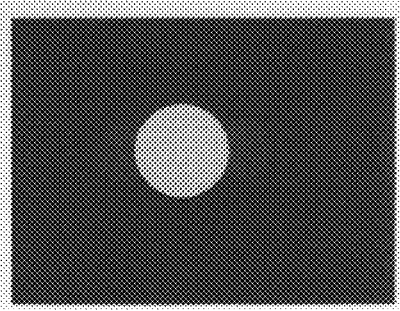
Figure 18E:
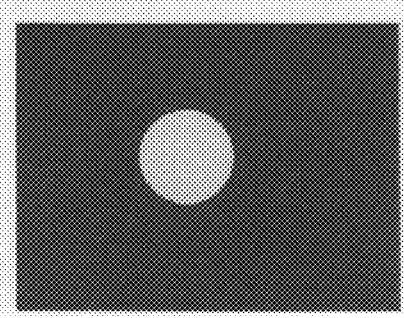

FIG. 12 is a flow chart of the steps of the elimination of the ghost or cross image effect according to a preferred embodiment of the present invention. The elimination process uses a modifiable positive and negative ratio combination of both eye images together for each eye. The methodology of the process is shown in FIG. 12:

84—Display x1% of (left image)−x2% of (right image)+ (x3% of white),
86—open left-eye LCD shutter,
88—close right-eye LCD shutter,
90—Display y1% of (right image)−y2% of (left image))+ (y3% of white),
92—open right-eye LCD shutter,
94—close left-eye LCD shutter,
and return to step 84 for the next image.

Instead of swapping left-eye and right-eye images for each frame, each frame now has a fusion of both left and right-eye images.

The (x1, x2, x3) and (yl, y2, y3) percentages could be chosen as follows: (90, 10, 10) and (90, 10, 10). These percentages are provided as examples and are oversimplified. The real percentage are programmable and change with different monitors and different LCD shutter types as well as with different video modes and different portions of the display.

These values can be both preset or adjusted by the user. The calibration would consist of creating an intentional ghost, seen with the LCD shutter glasses on and asking the user to adjust the display using the keyboard or a mouse until the ghost disappears.

The effect of the so-called "cross-image" is reduced by preparing in the computer generator system (the 3D video game system, for example) adapted left eye and right eye images which take into consideration a difference between the last image displayed on the display for one eye and the current image to be displayed for the other eye in such a way as to erase the ghost image of the last image. In very simplistic terms, this is achieved by subtracting the last image from the current image and adjusting the intensity of the current image in order for the displayed image to be properly balanced. For example, after displaying a left eye image from one perspective, the right eye image being displayed on a display screen will take into account the decaying left eye image present on the screen such that the combined image of the new image traced out on the display screen and the decaying past image will give the perfect right eye image. This provides cleaner separation between left eye and right eye images and thus eliminates the cross-image effect which is typically associated with lack of clarity of vision and headaches caused by the use of such 3-D display devices.

A detailed example will now be shown using the following figures. FIG. 5 and FIG. 6 are again used as source images. The same technique is used to prepare them. However, in the case of the present invention, the ghost removal process is applied to the source images. FIG. 13 shows the double image created by the combination of the left and right source images when looking at the screen without the glasses on. FIG. 14 is an example of what would be seen through the left lens of the LCD shutter glasses. Compared to the non ghost removed images, this high quality image helps create a flawless holographic illusion. This is what allows the creation of super high definition ghostless holograms. FIG. 15 is an equivalent of FIG. 14 but for the right eye. FIG. 16 and FIG. 17 are respectively generated images from the ghost removal process for the left and right eye. Instead of having ghosts that show doubles, the ghost removal generated images compensate for the image leakage.

A calibration process to adjust the compensation of the ghost effect will now be discussed. This process applies to all forms of stereo multiplexed images. The unwanted ghost or cross image bleed through problem applies to plain polarized 3D glasses as well as 3D LCD shutter technology. This document describes a method to calibrate the cross image elimination process.

It is possible to use a simple test image to adjust the needed compensation for canceling the unwanted bleed through. Referring now to FIGS. 4A to 4D and to FIGS. 18A, 18B, 18C, 18D and 18E, a calibration example will be explained. This example takes into consideration that the example of FIGS. 4A to 4D is used to help the viewer calibrate the apparatus. It must be understood that any other simple image could be used for the calibration. The left and right circles which should appear as one 3-D circle are used because the viewer will easily understand the principle and the goal of the calibration.

First, the viewer must find how dark the bleed through circles are. To do this, we allow the user to adjust the background black level (e.g. using mouse or keyboard arrows to raise and lower compensation) until the circles disappear. The adjustment area is depicted by the dotted portion of the image of FIG. 18A. Without compensation, the image is of the type of FIG. 18B. When overly compensated, the image is of the type of FIG. 18C. When under compensated, the image is of the type of FIG. 18D. When properly compensated, the image is of the type of FIG. 18E. Once properly compensated, the computer now knows what the viewer sees when there is a 100% white object in the image for one eye and, in the same area, a pure black object for the other eye. In the example, the bleed through is 15% of white and is calculated by the computer using the adjustment of the viewer.

This is a basic description of how one can calibrate the ghost removal process. There are many enhanced means of calibration like making separate calibration on different areas of the display apparatus, and calibrating individually the red, green, & blue components which make up the color of a CRT display. It will be understood that the calibration process could be done for each eye of the viewer.

It should be noted that when a reference to 100% white is made, the meaning is the brightest possible image the display apparatus can create. The display apparatus can again be a monitor, a projector, etc. When 0% white is referred to, the meaning is the darkest possible image the display apparatus can create.

The computer is now aware that a 100% white object in the display for one eye, over a 0% white object for the other eye creates a bleed through of 15% white. The first step of the ghost removal technique is to raise the brightness of the display by 15%. Now, the display will have slightly less contrast. The display range is now 15% to 100% instead of the full contrast of 0% to 100%.

The computer also knows that 100% white region for one eye over a 0% white region for the other creates 15% white ghost. To correctly remove the ghost, as the previous eye image region increases towards 100% white, we correct the next eye image by expanding its contrast from 15% to 100% white to a full 0% to 100%.

Therefore, as the pixel brightness increases to 100%, at the same coordinates of the next eye image, we increase the contrast of the next image from (15% to 100%) back to (0% to 100%). The display at 0% white will actually will be seen through the 3D viewing apparatus as 15% white, which was measured during the calibration. The viewer won't see the ghost since the correction made makes the black region equal to the new 15% black.

Figure 19:
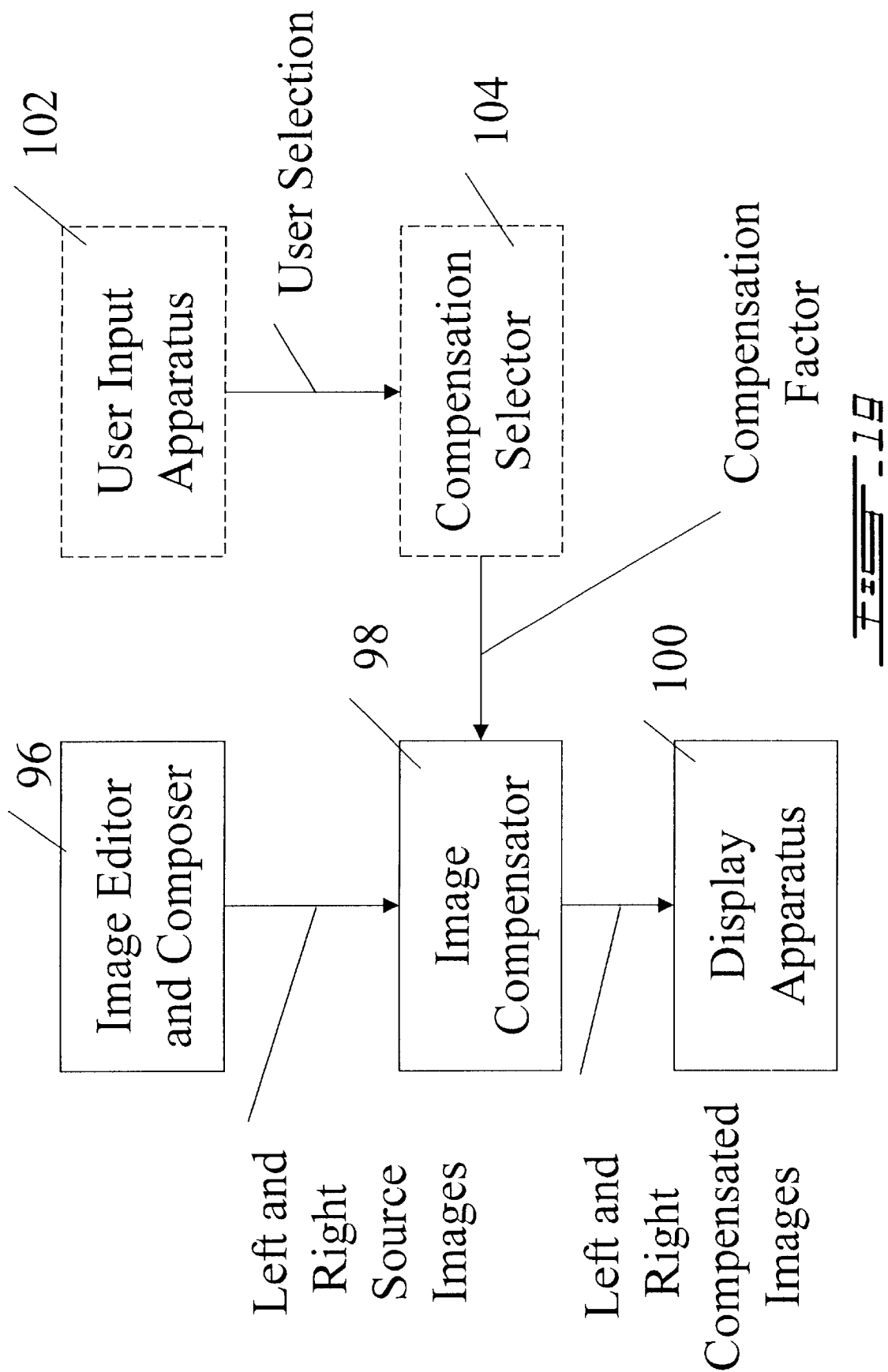
FIG. 19 is a block diagram of an apparatus according to a preferred embodiment of the present invention.

FIG. 19 is a block diagram of an apparatus according to another preferred embodiment of the present invention. An image editor and composer 96 is used to create the left and right source images. The image compensator 98 is used to modify the image and to compensate for image leakage. The compensated left and right images and then sent to the display apparatus 100 which will show them to the viewer. It is assumed that the viewer will be wearing the appropriate equipment to view the 3-D images. In the case of shutter glasses, the display apparatus will most likely be connected to the shutter glasses for synchronization of the signals.

An optional apparatus for calibrating the compensation of the ghosting effect can be added. This optional apparatus is identified by dashed boxes in FIG. 19. A compensation selector 104 can be provided. This compensation selector 104 can be a graphical adjustment provided on the display apparatus 100 or on an external unit. Preferably, it includes a user input interface 102 which is used by the viewer to select the proper amount of compensation.

It will be understood that the viewer could use the method for the calibration of the compensation described above or could simply be provided with adjustments for each of the parameters of concern (i.e. proportion of source image, proportion of complementary source image, proportion of white, etc.). These adjustments could be in the shape of slide bars, rotary dials or any other form of selection. The adjustments could also be numerical and entered with a keyboard. It will also be understood that a different calibration could be done for each eye, each image or each sequence of images. It will also be understood that this calibration will vary depending on the screen, the location on the screen, the viewer's eyes, the quality of the 3-D glasses and the quality of the images.

Figure 20:
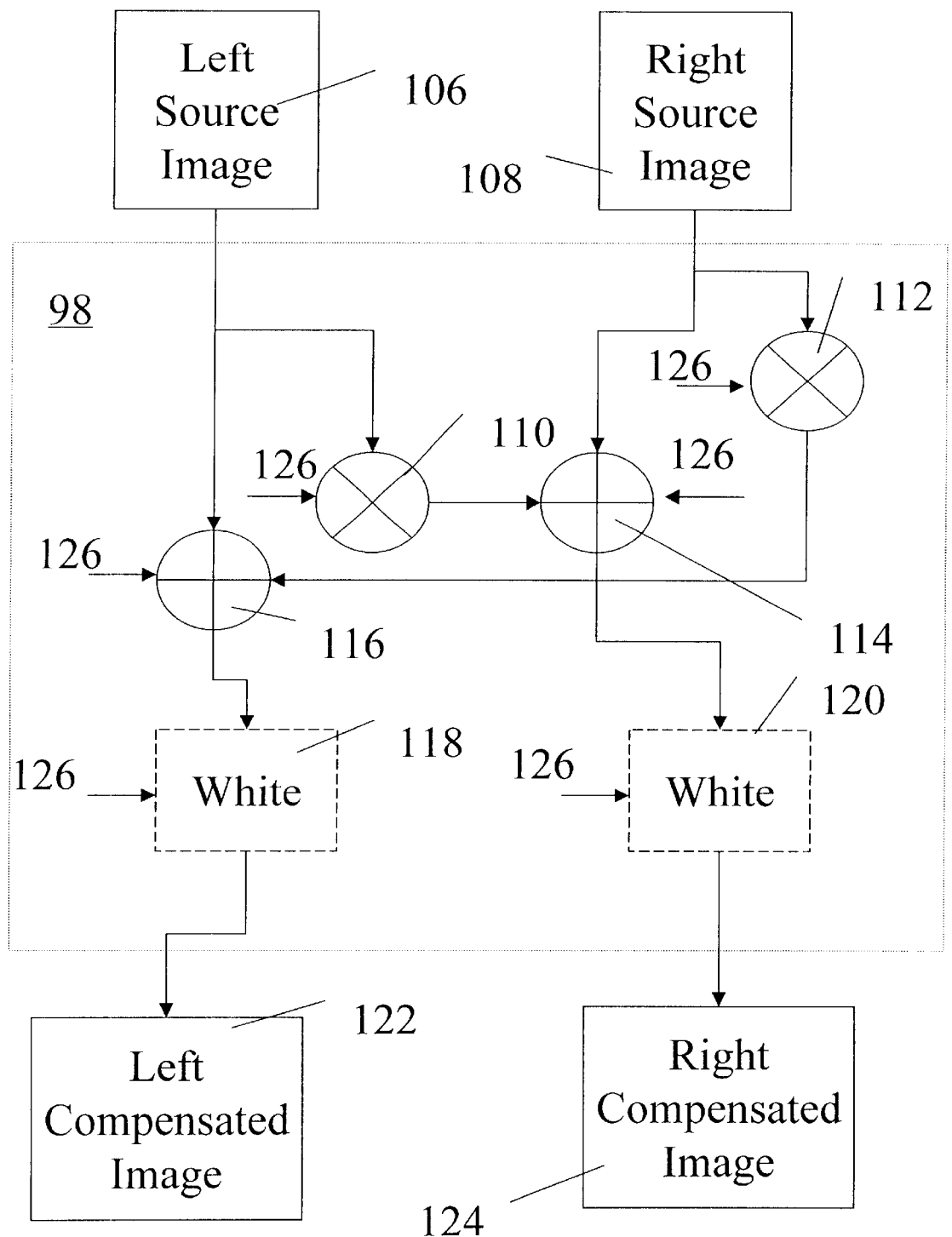
FIG. 20 is a detailed block diagram of the Image Compensator Module 98 of FIG. 19.

FIG. 20 is a detailed block diagram of a preferred embodiment of the image compensator module 98 of FIG. 19. The left and right source images, respectively 106 and 108 are used as inputs for the image compensator 98. A proportion of the left source image 106 is fed to a first adder 116. A proportion of the right source image 108 is fed to a second adder 114. A negative proportion calculated by a first multiplier 112 of the right source image 108 is fed to the first adder 116. A negative proportion calculated by a second multiplier 110 of the left source image 106 is fed to the second adder 114. It will be understood that different embodiments will produce combinations of left and right source images. In this preferred embodiment, a small percentage of the right source image will be subtracted from a bigger percentage of the left source image to produce a compensated left image and similarly for the compensated right image. An optional white treatment can be added, respectively at 118 and 120, to perfect the compensation. Again, a percentage of white will be added to the compensated images. The left 122 and right 124 compensated images will then be displayed.

An optional compensation factor 126 from the compensation selector 104 of FIG. 19 can be introduced at the first 116 and second 114 adders, at the first 112 and second 110 multipliers or at the first 118 and second 120 white adders to adjust the compensation and the percentages.

Figure 21:
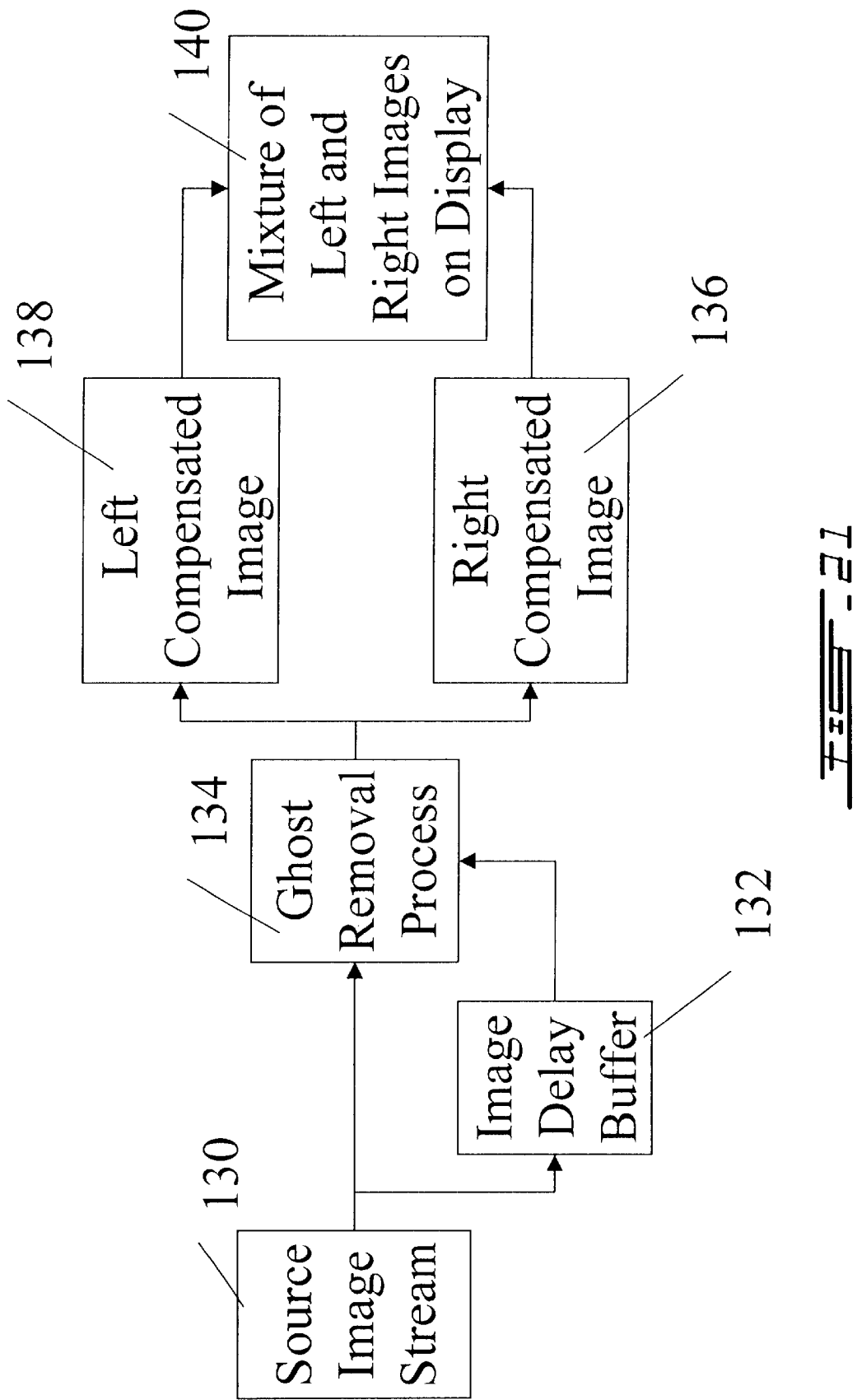
FIG. 21 is a block diagram of an apparatus for compensating stereo images made using the techniques of the prior art.

FIG. 21 shows an apparatus for compensating stereo images made according to a method of the prior art. The source image stream 130 is the stream of pre-made stereo images to broadcast. It usually begins with a left image of the first frame to be displayed and then comprises a right image of the same frame to be displayed and so on. It is assumed that the whole apparatus is programmed to know which image will come first. This source image stream 130 is fed both to a ghost removal device 134 which performs the ghost removal technique of the preferred embodiment of the present invention and to an image delay buffer 132 which delays the stream. The delayed stream produced by the image delay buffer 132 is also fed to the ghost removal device 134 which uses both signals to compensate for the ghosting effect as discussed in relation with the preferred embodiment. The ghost removal apparatus 134 creates a left compensated image 138 and a right compensated image 136 which are then combined to create the mixture of left and right images to be displayed 140. This mixture can be fed to a standard 3-D projection system.

While the invention has been described in connection with specific embodiments thereof, it will be understood that it is capable of further modifications and this applications intended to cover any variations, uses, or adaptations of the invention following, in general, the principles of the invention and including such departures form the present disclosure as come within known or customary practice within the art to which the invention pertains and as may be applied to the essential features hereinbefore set forth, and as follows in the scope of the appended claims.

I claim:

1. A method for eliminating a ghosting effect in images to be viewed with a 3-D stereoscopic apparatus, the method comprising:
    a) creating a left source image and a right source image from a test image wherein ghosting effect has been emphasized;
    b) modifying the left source image using a parameter and information from the right source image to create a compensated left source image;
    c) modifying the right source image using said parameter and information from the left source image to create a compensated right source image;
    d) displaying the compensated left image and compensated right image on a common display in a manner enabling 3-D viewing;
    e) at least one of Increasing and decreasing said parameter;
    f) repeating steps b) through e) until said ghosting effect disappears;
    g) creating a left source image and a right source image from a video source;
    h) modifying the left source image using said parameter and information from the right source image to create a compensated left source image:
    i) modifying the right source image using said parameter and information from the left source image to create a compensated right source image;
    j) displaying the compensated left image and compensated right image on a common display in a manner enabling 3-D viewing and
        wherein a viewer sees a 3-D stereoscopic image of the left and right images with reduced cross image.

2. A method as claimed in claim 1, wherein said parameter comprises at least one parameter of the proportion of the left eye image, the proportion of white and the proportion of the right eye image.

3. A method as claimed in claim 1, wherein the step of adjusting said parameter is carried out for each eye.

4. A method as claimed in claim 1, wherein said steps of modifying said left source image and said right source image comprises:
    creating a compensated left image by taking a first percentage of said left source image and subtracting a second percentage of said right source image;
    creating a compensated right image by taking a third percentage of said right source image and subtracting a fourth percentage of said right source image.

5. A method as claimed in claim 4, wherein said second and fourth percentages are the same.

6. A method as claimed in claim 4, wherein said first and third percentages are the same.

7. A method as claimed in claim 5, wherein said first and third percentages are the same.

8. A method as claimed in claim 4, wherein said step of creating a compensated left image further comprises adding a fifth percentage of white and wherein said step of creating a compensated right image further comprises adding a sixth percentage of white.

9. A method as claimed in claim 8, wherein said fifth and sixth percentages are the same.

10. A method as claimed in claim 7, wherein said step of creating a compensated left image further comprises adding a fifth percentage of white and wherein said step of creating a compensated right image further comprises adding a sixth percentage of white.

11. A method as claimed in claim 10, wherein said fifth and sixth percentages are the same.

12. A method as claimed in claim 1, wherein said parameter is an so adjustable background color.

13. A method for eliminating a ghosting effect in images prepared for 3-D viewing by a 3-D stereoscopic apparatus, the method comprising
- obtaining a source image stream containing alternating left source images prepared for 3-D viewing and right source images prepared for 3-D viewing;
- buffering the source image stream by a delay of one image;
- using the buffered source image stream and the source image stream to obtain the corresponding left and right source images;
- modifying the left source image using information from the right source image to create a compensated left source image;
- modifying the right source image using information from the left source image to create a compensated right source image;
- displaying the compensated left image and compensated right image on a common display in a manner enabling 3-D viewing and
- wherein a viewer sees a 3-D stereoscopic image of the left and right images with reduced cross image.

14. A method as claimed in claim 13, further comprising:
- providing an adjustment for at least one parameter of a proportion of the left source image and a proportion of the right source image used in said modifying;
- obtaining a user input with respect to the image displayed;
- using the user input to calibrate the modifying done on the source images.

15. A method as claimed in claim 14, wherein the step of providing an adjustment comprises providing an adjustment for at least one parameter of the proportion of the left eye image, the proportion of white and the proportion of the right eye image.

16. A method as claimed in claim 14, wherein the steps of providing, obtaining and using are carried out for each eye.

17. A method as claimed in claim 13, wherein said steps of modifying said left source image and said right source image comprises:
- creating a compensated left image by taking a first percentage of said left source image and subtracting a second percentage of said right source image;
- creating a compensated right image by taking a third percentage of said right source image and subtracting a fourth percentage of said right source image.

18. A method as claimed in claim 17, wherein said step of creating a compensated left image further comprises adding a fifth percentage of white and wherein said step of creating a compensated right image further comprises adding a sixth percentage of white.

19. A method as claimed in claim 14, wherein said step of providing an adjustment comprises:
- displaying a test image with an adjustable background color wherein said ghosting effect has been emphasized;
- at least one of increasing and decreasing a darkness of said adjustable background color until said ghosting effect disappears;
- calculating a percentage of leak through responsible for said ghosting effect.

* * * * *